US009253228B2

(12) United States Patent
Lee et al.

(10) Patent No.: US 9,253,228 B2
(45) Date of Patent: Feb. 2, 2016

(54) CLOUD COMPUTING METHOD, COMPUTING APPARATUS AND SERVER USING THE SAME

(71) Applicant: SAMSUNG ELECTRONICS CO., LTD., Suwon-si (KR)

(72) Inventors: Dae-hyun Lee, Hwaseong-si (KR); Chun-un Kang, Seoul (KR); Moon-su Kim, Goesan-gun (KR); Jeong-gon Kim, Gwangmyeong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 472 days.

(21) Appl. No.: 13/710,654

(22) Filed: Dec. 11, 2012

(65) Prior Publication Data

US 2013/0151672 A1 Jun. 13, 2013

(30) Foreign Application Priority Data

Dec. 13, 2011 (KR) .......................... 10-2011-0133781

(51) Int. Cl.
  *G06F 15/16* (2006.01)
  *H04L 29/06* (2006.01)
  *H04L 29/08* (2006.01)
  *H04W 4/00* (2009.01)
  *G06F 9/445* (2006.01)

(52) U.S. Cl.
  CPC .............. *H04L 65/4069* (2013.01); *G06F 8/63* (2013.01); *G06F 9/445* (2013.01); *H04L 67/34* (2013.01); *H04W 4/003* (2013.01)

(58) Field of Classification Search
  CPC ...... H04L 65/4069; H04L 67/34; G06F 9/445
  See application file for complete search history.

(56) References Cited

U.S. PATENT DOCUMENTS

| 6,339,826 | B2* | 1/2002 | Hayes et al. ................... 713/166 |
| 8,560,694 | B2* | 10/2013 | Keller et al. .................. 709/226 |
| 8,918,712 | B2* | 12/2014 | Nario et al. ................... 715/239 |
| 2003/0022657 | A1* | 1/2003 | Herschberg et al. .......... 455/414 |
| 2003/0143991 | A1* | 7/2003 | Minear et al. ................. 455/419 |
| 2005/0066325 | A1* | 3/2005 | Mori ........................ G06F 8/61 717/174 |
| 2005/0160104 | A1* | 7/2005 | Meera ....................... G06F 8/20 |
| 2007/0169075 | A1* | 7/2007 | Lill ........................... G06F 8/61 717/168 |
| 2009/0271779 | A1* | 10/2009 | Clark ................ G06F 17/30174 717/171 |
| 2012/0174095 | A1* | 7/2012 | Natchadalingam ....... G06F 8/65 718/1 |
| 2014/0114901 | A1* | 4/2014 | Pradhan et al. ................. 706/50 |

OTHER PUBLICATIONS

Communication from the European Patent Office issued Mar. 11, 2013 in counterpart European Application No. 12196045.4.

* cited by examiner

*Primary Examiner* — Jonathan Bui
(74) *Attorney, Agent, or Firm* — Sughrue Mion, PLLC

(57) ABSTRACT

A cloud computing method and a computing apparatus and server using the same are provided. The cloud computing method includes a server generating a virtual disc for executing one or more applications when a computing apparatus is connected to the server, requesting execution of an application included in the virtual disc, and downloading and executing an execution file corresponding to the requested application. Therefore, it is possible for a user to remove time delay caused in a downloading and executing process when an application is initially executed.

35 Claims, 7 Drawing Sheets

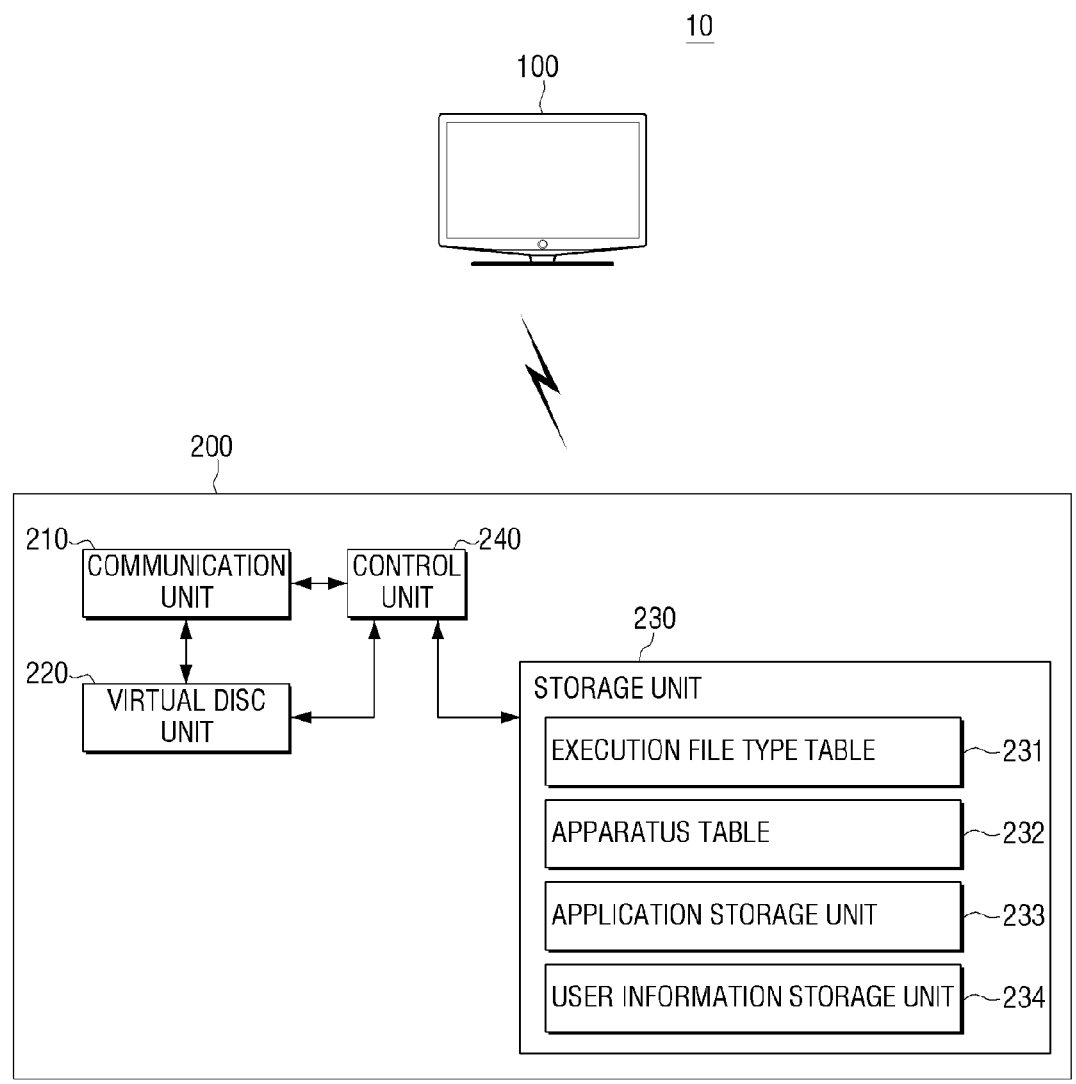

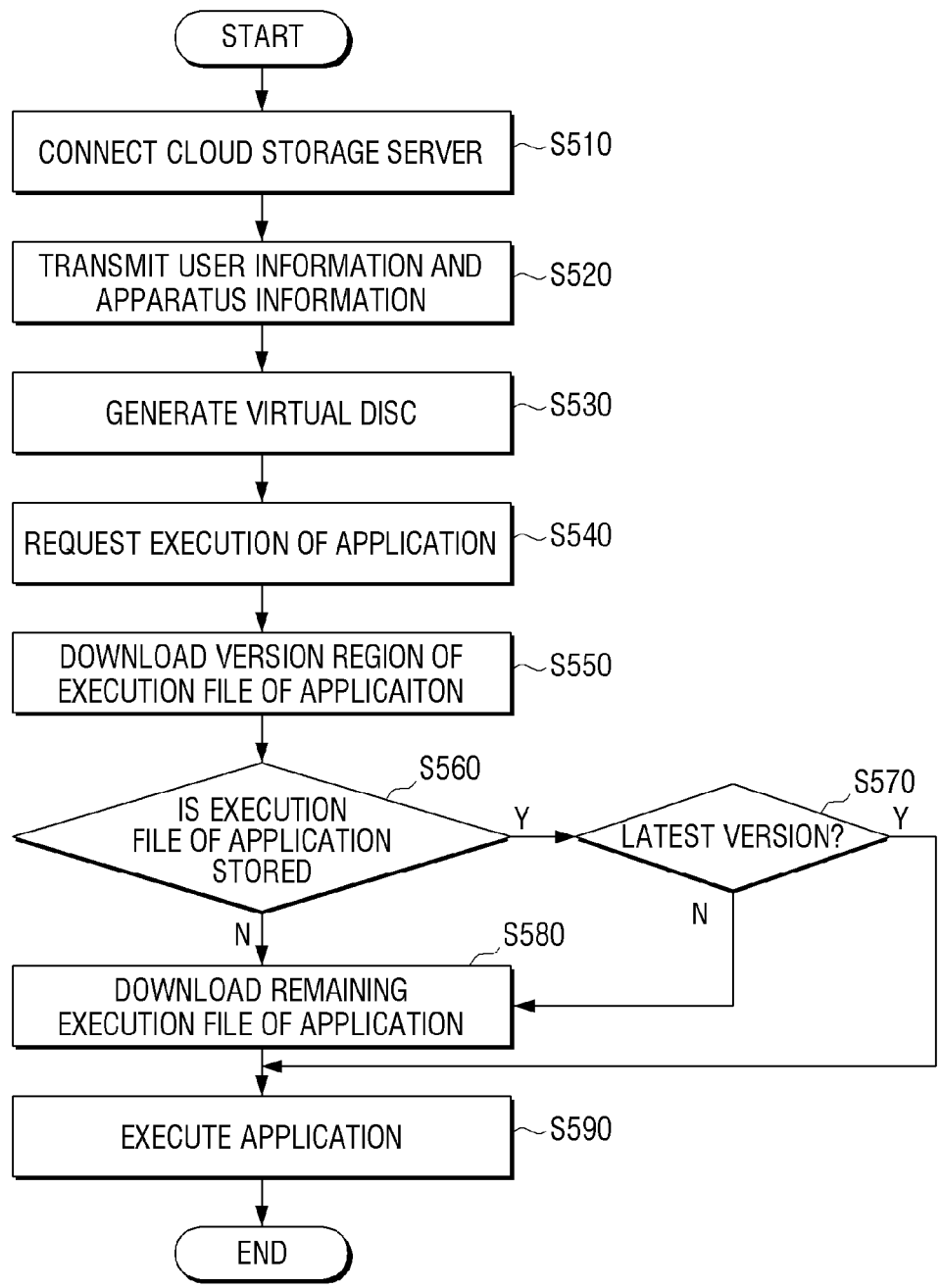

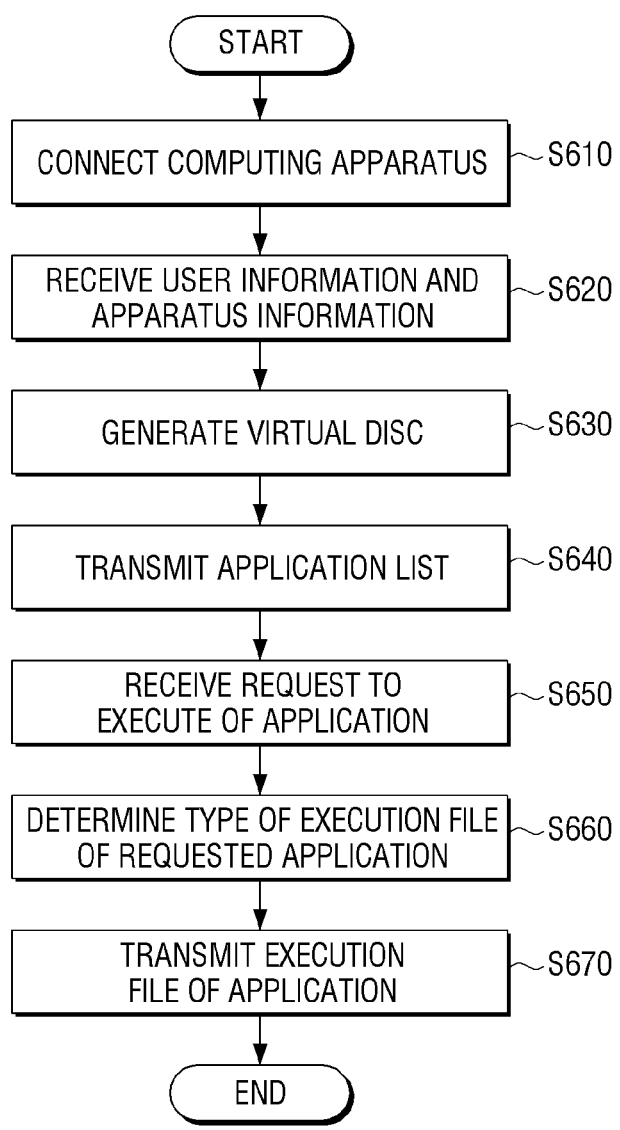

CLOUD COMPUTING METHOD, COMPUTING APPARATUS AND SERVER USING THE SAME

CROSS-REFERENCE TO RELATED APPLICATION

This application claims priority from Korean Patent Application No. 10-2011-0133781, filed on Dec. 13, 2011, in the Korean Intellectual Property Office, the disclosure of which is incorporated herein by reference in its entirety.

BACKGROUND

1. Field

Apparatuses and methods consistent with exemplary embodiments relate to a cloud computing method, a computing apparatus and server using the same, and more particularly, to a method of providing an application using a cloud server which provides a cloud storage service, and a computing apparatus and server using the same.

2. Description of the Related Art

In recent years, there is provided a cloud storage service which stores data and provides the data to users on a network. The cloud storage service enables the users to use various contents in the outside without separate storage devices (for example, a universal serial bus (USB) and an external hard disc).

The cloud storage service of the related art stores various types of files (for example, video files, photo files, music files, text files, and the like) including application files in a server and provides uniform resource locators (URLs) or real time streaming protocols (RTSPs) for download or streaming of stored various types of files.

To execute an application using the cloud storage service of the related art, the user selects, purchases, and downloads the application in a user terminal. Hereafter, after checking whether or not installation authority is present therein before installation, the user should install the application in the user terminal and then execute the installed application.

That is, various procedures are performed to execute an application using the cloud storage service of the related art and a lot of time is needed to download and install the application. In addition, separate applications stores should be constructed according to apparatus characteristics such as operating systems (OSs) and platforms for terminals or interfaces should be provided to download an application suitable to the user terminal. Further, it is cumbersome for a user to redownload and reinstall an updated application when an updated application is released.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments is provided to a method of providing an application capable of immediately executing an application in a cloud storage server by generating a virtual disc without a procedure of downloading and installing the application, a computing apparatus using the same, and a server.

According to an aspect of an exemplary embodiment, there is provided a cloud computing method. The method may include: receiving, by a computing apparatus, a virtual disc for executing an application from a server connected to the computing apparatus; transmitting a request to execute the application; and downloading and executing an execution file corresponding to the requested application.

The receiving a virtual disc may include transmitting user information and apparatus information to the server; and receiving an application list comprising one or more applications available to a user of the computing apparatus from the server based on the user information and the apparatus information.

The application list may include at least one of among an identification (ID) and a title of the one or more applications available to the user.

The requesting execution may include transmitting one of among the ID and the title of the application to be executed to the server to request execution for the application.

The downloaded execution file may be determined based on a platform and operating system (OS) of the display apparatus.

The downloading and executing an execution file may include determining whether the execution file of the requested application has been previously stored, determining whether a version of the previously stored execution file is the most recent version when in response to a determination that the execution file of the requested application has been previously stored, and executing the previously stored execution file in response to a determination that the version of the previously stored execution file is the most recent version.

The downloading and executing an execution file may further include downloading and executing the execution file of the requested application in response to a determination that the execution file of the requested application has not been previously stored.

Additionally, the downloading and executing an execution file may further include downloading and executing the execution file of the requested application in response to a determination that the version of the execution file of the stored application is not the most recent version.

The execution file of the application may include a version region, a code region, and a resource region. The downloading and executing an execution file may include downloading the version region of the execution file of the application to determine whether or not the execution file of the requested application is a stored execution file and whether or not the version of the execution file of the stored application is the latest version.

Alternatively, the downloading and executing an execution file may include downloading and executing a minimum region of the execution file of the requested application to execute the requested application before downloading a remaining region of the execution file of the requested application.

According to another aspect of an exemplary embodiment, there is provided a computing apparatus. The computing apparatus may include: a communication unit which communicates with a server, receives from the server a virtual disc for executing an application, and transmits to the server a request to execute the application; and a control unit which downloads and executes an execution file corresponding to the requested application.

The control unit may control the communication unit to transmit user information and apparatus information to the server and receive an application list comprising one or more applications available to a user of the computing apparatus from the server based on the user information and apparatus information.

The application list may include at least one of among an ID and a title of each of the one or more applications available to the user.

The communication unit may transmit to the server one of among an ID and a title of an application to be executed to request execution of the application.

The downloaded execution file may be determined based on a platform and OS of the computing apparatus.

The control unit may determine whether the execution file of the requested application has been previously stored, determine whether a version of the previously stored execution file is a most recent version in response to a determination that the execution file of the requested application file has been previously stored, immediately execute the application when it is determined that the version of the execution file of the stored application is the latest version.

Alternatively, the control unit may download and execute the execution file of the application when it is determined that the execution file of the requested application has not been previously stored or that the version of the execution file of the stored application is not the latest version.

The execution file of the application may include a version region, a code region, and a resource region and the control unit may download the version region of the execution file of the application to determine whether or not the execution file of the requested application is a stored execution file and whether or not the version of the execution file of the stored application is the latest version.

The control unit may download a minimum region of the execution file of the application to execute the application and execute the application before downloading remaining regions of the execution file of the application.

According to another aspect of an exemplary embodiment, there is provided a cloud computing method. The method may include: receiving, by a server, user information and apparatus information of a computing apparatus from the computing apparatus; generating a virtual disc based on the user information and the apparatus information of the computing apparatus and transmitting an application list comprising one or more applications available to a user of the computing apparatus; and when request on the execution of an application is received from the display apparatus, transmitting an execution file corresponding to the requested application.

The application list may include at least one of an ID and a title of each of the applications available to the user.

The receiving a request to execute an application may include receiving one of an ID and a title of the application to be executed from the computing apparatus.

The execution file may be determined based on a platform or OS of the computing apparatus.

The execution file of the application may include a version region, a code region, and a resource region. The transmitting an execution file may include first transmit the version region of the execution of the application.

Alternatively, the transmitting an execution file may include transmitting a minimum region of the execution file of the application to execute the application before transmitting a remaining region of the execution file of the application.

According to another aspect of an exemplary embodiment, there is provided a server. The server may include: a communication unit which communicates with a computing apparatus, receives user information and apparatus information from the computing apparatus, transmits an application list comprising applications available to a user of the computing apparatus, and receives a request to execute an application from the computing apparatus; and a control unit which generates a virtual disc based on the user information and the apparatus information of the computing apparatus and, when request on execution of an application is received from the computing apparatus, controls the communication unit to transmit an execution file corresponding to the requested application.

The application list may include at least one of an ID and a title of each of the applications available to the user.

The receiving a request to execute an application may include receiving one of an ID and a tile of the application to be executed from the computing apparatus.

The execution file of the application may be determined based on a platform or an operating system (OS) of the computing apparatus.

The execution file of the application may include a version region, a code region, and a resource region and the control unit may control the communication unit to first transmit the version region of the execution file of the application.

The control unit may control the communication unit to transmit a minimum region of the execution file of the application to execute the application before transmitting a remaining region of the execution file of the application.

Additional aspects and advantages of exemplary embodiments will be set forth in the detailed description, will be obvious from the detailed description, or may be learned by practicing the exemplary embodiments.

BRIEF DESCRIPTION OF THE DRAWING FIGURES

The above and/or other aspects will be more apparent by describing in detail exemplary embodiments, with reference to the accompanying drawings, in which:

FIG. 4 is a block diagram illustrating a configuration of a cloud storage server according to exemplary embodiments;

FIG. 5 is a flowchart illustrating a method of providing an application of a display apparatus according to exemplary embodiments; and FIG. 6 is a flowchart illustrating a method of providing an application of a cloud storage server according to exemplary embodiments.

DETAILED DESCRIPTION OF THE EXEMPLARY EMBODIMENTS

Figure 1:
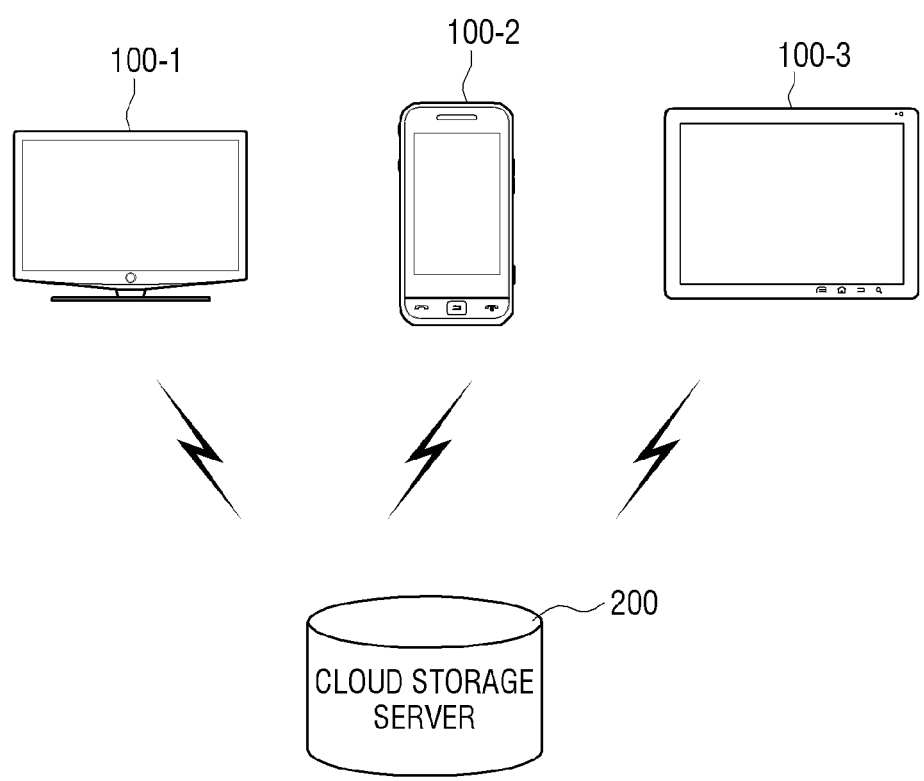
FIG. 1 is a view illustrating a system providing an application according to exemplary embodiments.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a view illustrating an application providing system 10 according to exemplary embodiments. The application providing system 10 includes a display apparatus 100 and a cloud storage server 200. As shown in FIG. 1, the computing apparatus 100 may be implemented with a television 100-1, a mobile phone 100-2, and a tablet personal computer (PC) 100-3, but the computing apparatus is not limited thereto. Other computing apparatuses (for example, a laptop PC, a desktop PC, a personal digital assistant (PDA), and the like) which are capable of executing applications may be applied as the computing apparatus 100. The computing apparatus may include a display.

When the computing apparatus is connected to the cloud storage server 200, the computing apparatus 100 generates a virtual disc for executing at least one of a plurality of applications using the cloud storage server 200. The virtual disc does not have a physically allocated storage space. However, the virtual disc denotes to be recognized as a local disc of the computing apparatus 100 by virtualizing a storage space in the cloud storage server 200 as if the storage space are directly connected to the computing apparatus 100.

When the virtual disc is generated, the computing apparatus 100 receives an application list including a plurality of applications which are executable from the cloud storage server 200. The applications included in the application list may have been previously installed in the virtual disc and thus directly is provided to a user as applications having immediately executable stages.

When an execution command for one of the plurality of applications is input, the computing apparatus 100 requests execution for the application in which the execution command is input to the cloud storage server 200.

The computing apparatus 100 downloads a partial region of an execution file (for example, a version region) corresponding to the application in which the execution command is input and determines whether or not the application in which the execution command is input is an application which has been previously stored and whether or not the application in which the execution application is input is an application of the most recent version.

When it is determined that the application in which the execution command is input is the application which has been previously stored and the application of the most recent version, the computing apparatus 100 immediately executes a previously stored application.

However, when it is determined that the application in which the execution command is input is not the previously stored application or the application of the most recent version, the computing apparatus 100 downloads a remaining region of the execution file of the application in which the execution command is input. The computing apparatus 100 may randomly download the remaining region of the execution file of the application. The above-described process will be described in detail with reference to FIGS. 3A to 3E.

When a minimum file for performing a code is downloaded, the computing apparatus 100 immediately executes the application.

When the cloud storage server 200 is connected to the computing apparatus 100, the cloud storage server 200 receives user information and apparatus information of the computing apparatus 100 from the computing apparatus 100.

The cloud storage server 200 generates a virtual disc of the computing apparatus 100 based on the received user information and apparatus information. The virtual disc may include a plurality of installed applications and the cloud storage server 200 transmits an application list including the plurality of installed applications to the computing apparatus 100.

When a request to execute an application is received from the computing apparatus 100, the cloud storage server 200 determines a type of an execution file of the requested application. The type of the execution file of the application may be determined by the OS and platform provided from the computing apparatus 100. However, this is only an exemplary embodiment and the type of the execution file of the application may be determined by various factors such as a size of a display screen and three-dimensional (3D) function support.

When the type of execution file of the application is determined, the cloud storage server 200 transmits an execution file of an application. However, when the computing apparatus 100 has already downloaded the partial region (for example, a version region) of the execution file of the application and determines that downloading the execution file is not necessary, the cloud storage server 200 stops transmitting the execution file of the application and prevents repetitive file transmission.

By the above-described application providing system 10, it is possible for a user to remove time delay caused in a process of downloading and executing an application when the application is initially executed and the most recent version of the application is updated using the virtual disc of the cloud storage server 200.

Hereinafter, the computing apparatus 100 and the cloud storage server 200 will be described in more detail with reference to FIGS. 2 and 3A to 3E.

Figure 2:
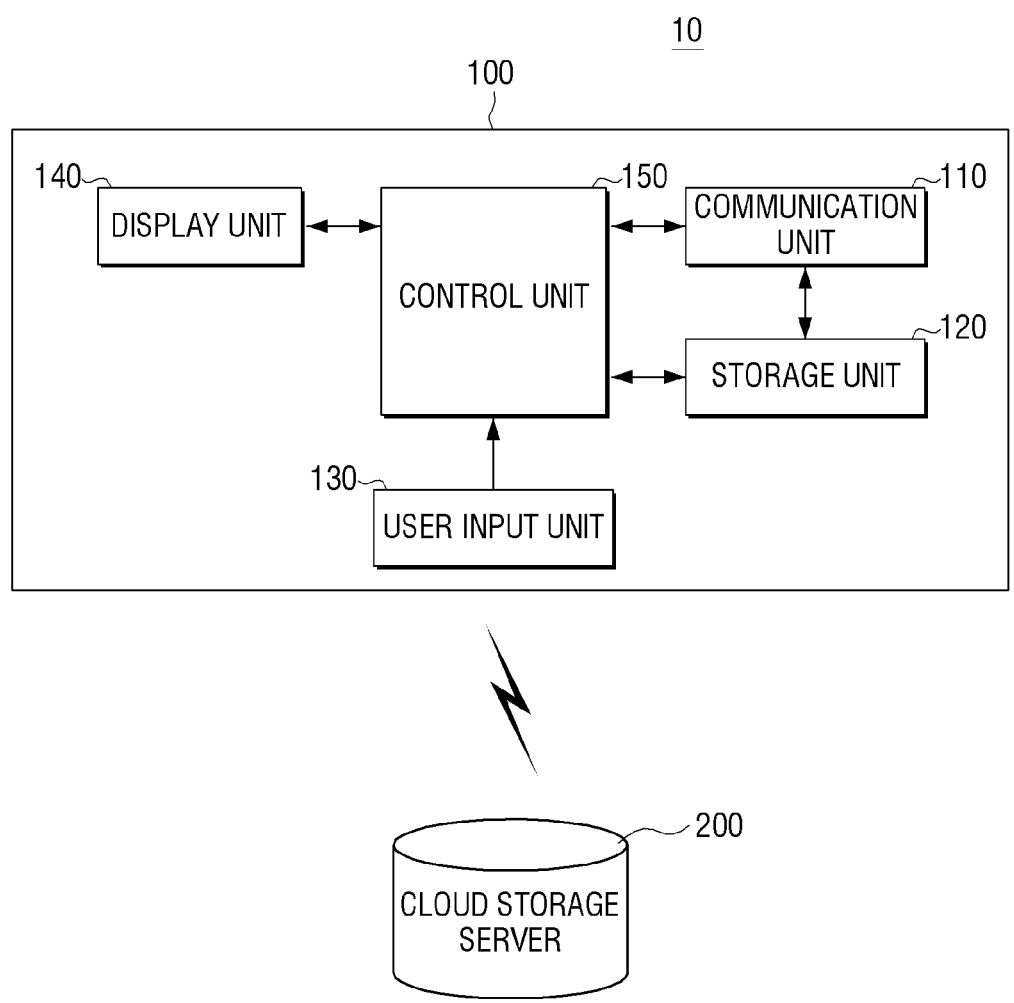
FIG. 2 is a block diagram illustrating a configuration of a display apparatus according to exemplary embodiments.

FIG. 2 is a block diagram illustrating a configuration of the computing apparatus 100 according to exemplary embodiments. As shown in FIG. 2, the computing apparatus 100 may include a communication unit 110, a storage unit 120, a user input unit 130, a display unit 140, and a control unit 150. The computing apparatus 100 may be implemented with a television 100-1, a mobile phone 1002, and a tablet PC 100-3, but the computing apparatus 100 is not limited thereto. The computing apparatus 100 may be implemented other computing apparatuses (for example, a laptop PC, a desktop PC, PDA, etc.) which are capable of executing an application.

The communication unit 110 performs communication with an external cloud storage server 200 through a network. The communication 100 may be implemented with a wired connection, such as ethernet, or a wireless connection, such as wireless-fidelity (Wi-Fi), etc.

The storage unit 120 stores various data and programs for driving the computing apparatus 100. In particular, the storage unit 120 stores the user information and apparatus information of the computing apparatus. In addition, the storage unit 120 may store execution files of applications which have been installed.

The user input unit 130 receives a user command for controlling the computing apparatus 100. For example, the user input unit 130 may be implemented with a touch screen, a remote controller, a keyboard, a mouse, a button, etc., but the user input unit 130 is not limited thereto.

The display unit 140 displays an image signal-processed by control of the control unit 150. The display unit 140 may display an execution screen of an application provided from the cloud storage server 200.

The control unit 150 controls an overall operation of the computing apparatus 100 according to a user command input through the user input unit 130. In particular, when the control unit 150 is connected to the cloud storage server 200 through the communication unit 110, the control unit 150 generates a virtual disc for executing at least one of a plurality of applications using the cloud storage server 200. When execution of an application included in the virtual disc is requested, the control unit 150 downloads and executes an execution file corresponding to the requested application.

For instance, when the computing apparatus 100 is connected to the cloud storage server 200, the control unit 150 controls the communication unit 110 to transmit the user information and apparatus information stored in the storage unit 120 to the cloud storage server 200. Computing apparatus 100 can be connected to cloud storage server 200 directly, through a local area network, through a wide area network, over the Internet, etc.

The control unit 150 generates the virtual disc using the cloud storage server 200 based on the transmitted user information and apparatus information. The virtual disc may not have a physically allocated storage space, but the virtual disc is recognized as a local disc of the computing apparatus 100 by virtualizing a storage space in the cloud storage server 200 as if the storage space is directly connected to the computing apparatus 100.

When the cloud storage server 200 generates an application list including applications to be available by the user and file system structure information which is executable by a device based on the user information and apparatus information and generates the virtual disc, the control unit 150 receives the application list from the cloud storage server 200 through the communication unit 110. Here, application list may include attribute information such as an ID and title of each of the applications.

The control unit 150 may display the received application list through the display unit 150. The applications included in the application list may have been previously installed in the cloud storage server 200 so that the applications may be displayed to be immediately executed to the user. In addition, when one of the applications is included in the application list through the user input unit 130, the control unit 150 transmits information such as an ID and title of the selected application to the cloud storage server 200 to request application execution.

When the cloud storage server 200 transmits an execution file of the requested application, the control unit 150 determines a version region of the execution file of the transmitted application to determine whether or not the execution file of the application has been previously stored and whether or not a version of the execution file of the application is the most recent version.

Specifically, when it is determined that the execution file of the application has been previously stored and the previously stored execution file is the most recent version of the execution file of the transmitted application, the control unit 150 stops downloading of the execution file of the requested application and immediately executes the execution file of the previously stored application. The version region of the execution file can be used to determine if the previously stored execution file is the most recent version of the execution file corresponding to the transmitted application.

When it is determined that the execution file of the requested application has not been previously stored or when it is determined that the version of the execution file of the requested application is not the most recent version, the control unit 150 controls the communication unit 110 to download a remaining region of the execution file of the requested application (for example, a code region and a resource region).

The execution file of the application transmitted from the cloud storage server 200 may be determined by the apparatus information of the computing apparatus 100. For example, the execution file of the application transmitted from the cloud storage server 200 may be determined by the OS and platform of the computing apparatus 100. However, this is only an exemplary embodiment and the execution file of the application may be determined by other factors (for example, supportable resolution of the display unit 140 of computing apparatus 100 and support/non-support of a 3D function).

The control unit 150 may download the execution file of the application using the process described below with reference to FIGS. 3A to 3E.

Figure 3A:
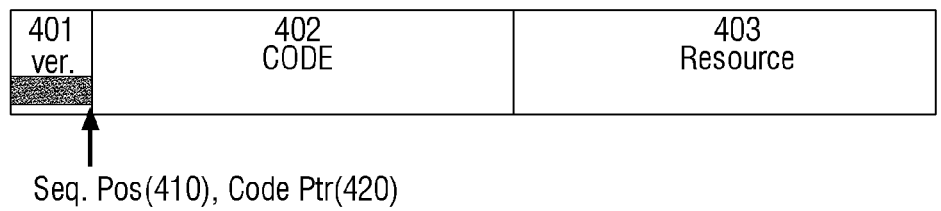
FIGS. 3A to 3E are views illustrating a process of downloading an execution file of an application according to exemplary embodiments.

As shown in FIG. 3A, the control unit 150 preferentially downloads a version region 401 including version information of the application. Sequentially, as shown in FIG. 3A, the control unit 150 allows a sequence position 410 and a code point 420 to be positioned at a starting point of the code region 420. However, as described above, when it is determined that the most recent version of the execution file of the requested application has been previously stored, the control unit 150 does not download the remaining region, that is, the code region 402 and a resource region 402.

Figure 3B:

When the sequence position 410 is positioned in a minimum region for executing an application, the control unit 150 executes the application and moves the code pointer 420. Meanwhile, when a minimum execution file for performing a code is downloaded while the execution file of the requested application is downloaded, the control unit 150 immediately executes the requested application. As shown in FIG. 3B, the code pointer 420 may jump from the sequence position 410 and start to download the code region 402 from an intermediate portion of the code region 402.

In addition, when a resource is referred to execute the application, the control unit 150 starts to download a resource pointer 430 from an arbitrary portion of the resource region 403 as shown in FIG. 3B.

The sequence position 410, the code pointer 420, and the resource pointer 430 may be downloaded in parallel and the priority of the download is in order of the code pointer 420, the resource pointer 430, and the sequence position 410.

Figure 3C:
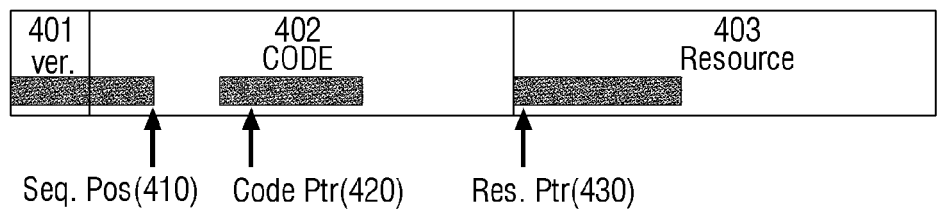

As shown in FIG. 3C, the code pointer 420 and the resource pointer 403 are randomly downloaded and the sequence position 410 is positioned in a non-downloaded region from the version region 401.

Figure 3D:
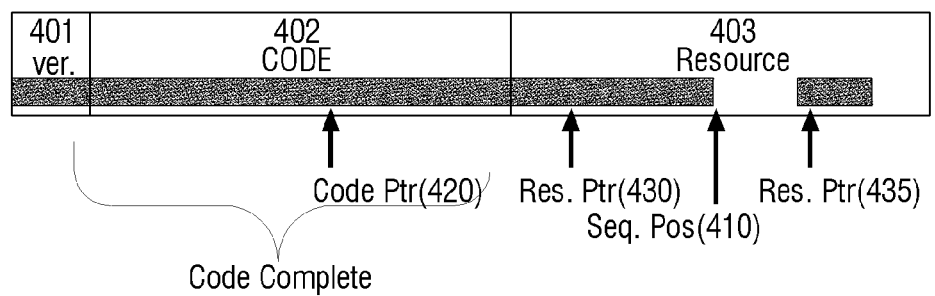

As shown in FIG. 3D, when the entire code region 402 is downloaded, the code pointer 420 does not need to perform downloading any longer and the resource pointers 430 and 435 may randomly download resources of several regions at once.

Figure 3E:
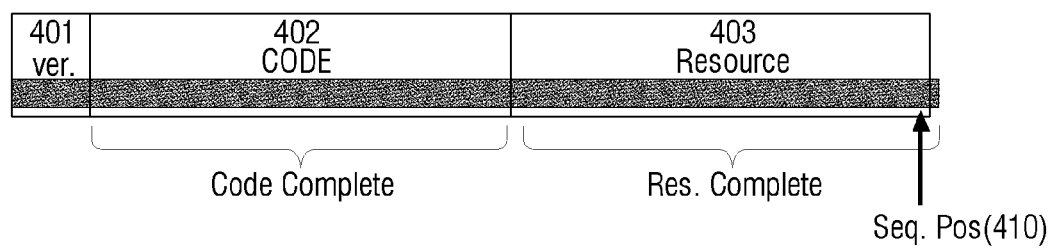

As shown in FIG. 3E, when the entire resource region 403 is downloaded, the sequence position 410 is positioned at the end point of the resource region 403 and the downloading is finished.

As described above, the computing apparatus 100 enables the user to remove time delay caused in the downloading and installing process when the application is initially executed using the virtual disc. In addition, an application may be automatically updated so the most recent version of the execution file is conveniently available to the user.

FIG. 4 is a view illustrating a configuration of the cloud storage server 200 according to exemplary embodiments. As shown in FIG. 4, the cloud storage server 200 includes a communication unit 210, a virtual disc unit 220, a storage unit 230, and a control unit 240.

The communication unit 210 performs communication with the computing apparatus 100, that is, the plurality of computing apparatuses 100-1, 100-2, and 100-3 of FIG. 1 through a network. The communication 210 may be implemented with a wired connection, such as ethernet, a wireless connection, such as wireless-fidelity (Wi-Fi), etc.

When the external computing apparatus 100 is connected to the virtual disc unit 220, a virtual disc is generated in the virtual disc unit 220 using the user information and apparatus information of the external computing apparatus 100.

Mount resources, installed application execution files, application resources, and other data (for example, application data, a device user profile, user data, etc.) may be stored in the virtual disc unit 220 according to the users and computing apparatuses 100.

The storage unit 230 stores various data to provide different virtual discs to the plurality of computing apparatuses 100-1, 100-2, and 100-3. Specifically, the storage unit 230 includes an execution file type table 231, a computing apparatus table 232, an application storage unit 233, and a user information storage unit 234.

The execution file type table 231 is a table which is managed by an application provider and a table which maps and manages execution files according to OSs and platforms of the computing apparatuses and factors affecting the execution of the application (for example, supportable resolution of the display of computing apparatus 100).

As an example, the execution file type table of the following table 1 may be stored in the storage unit 230.

TABLE 1

| Execution file | OS | platform | Screen size |
| --- | --- | --- | --- |
| BT00001.exe | Linux 2.1 | Genoa | 960 × 540 |
| BT00002.exe | iOS | iPhone 4 | 800 × 600 |
| BT00003.exe | Linux | Android | 800 × 600 |

The computing apparatus table 223 is a table including file system information in which a virtual disc is to be generated according to an OS and platform.

The application storage unit 233 stores an execution file which has direct information in which an application is to be executed in the computing apparatus 100, a resource, and content data. In particular, the application storage unit 233 stores an execution file package including execution files according to the OSs and platforms of the computing apparatuses 100. The application storage unit 233 also stores resources which are stored to execute applications regardless of the OSs and platforms. In addition, the application storage unit 233 stores application data which is to be played, or read using an application without driving of the application. The application data may have a shared structure to be available to multiple users.

The user information storage unit 234 stores user information for the computing apparatuses 100. In particular, the user information storage unit 234 stores execution environments of applications for users. When one user connects with cloud storage server 200 using multiple computing devices 100, the user information may be used through the plurality of computing apparatuses by user authentication. In addition, the user information storage unit 234 may store personal content data which is not shared with other users.

The control unit 240 controls an overall operation of the cloud storage server 200. Specifically, when the cloud storage server 200 is connected to the computing apparatus 100, the control unit 240 receives the user information and apparatus information from the computing apparatus 100 and generates a virtual disc in the virtual disc unit 220.

Specifically, the control unit 240 generates an application list including applications to be available to the user through the user information received from the computing apparatus 100 and generates file system structure information to be executable by the computing apparatus 100 through the apparatus information received from the computing apparatus 100. Then, the control unit generates the virtual disc of the connected computing apparatus 100 based on the generated application list and file system structure information. The applications stored in the virtual disc may have been previously installed.

The control unit 240 transmits the application list to the computing apparatus 100 through the communication unit 210.

When request for execution of one of the applications in the application list is received from the computing apparatus 100, the control unit 240 determines an execution file corresponding to the connected computing apparatus among the execution file packages stored in the application storage unit 233 based on previously received apparatus information and the execution file type table 231. The execution file may be determined by the platform and OS of the computing apparatus 100 and factors affecting the application execution (for example, supportable resolution of the display of computing apparatus 100 and support/non-support of a 3D function).

For example, when an OS, platform, and screen size of the connected computing apparatus 100 are a Linux, Android, and 800×600, respectively, the control unit 240 determines a type of the execution file of an application to be transmitted to the connected computing apparatus 100 as "BT00003.exe".

The control unit 240 transmits the determined execution file to the computing apparatus 100. The control unit 240 may preferentially transmit the version region of the execution file and stop transmission of the execution file if it is determined that the most recent version of the execution file has been previously stored in the computing apparatus. This is because the execution file has already been installed in the computing apparatus 100.

However, when it is determined that the most recent version of the requested application has not been previously stored, the control unit 240 transmits the entire execution file of the requested application. The control unit 240 may transmit the execution file of the requested application as described in FIGS. 3A to 3E.

As described above, the virtual disc of the cloud storage server 200 enables the user to remove the time delay caused in the downloading and installing process when the application is initially executed. In addition, the application may be automatically updated so the most recent version of the execution file is conveniently available to the user.

Hereinafter, a method of providing an application of the computing apparatus 100 and a method of providing an application of the cloud storage server 200 will be described with reference to FIGS. 5 and 6.

FIG. 5 is a flowchart illustrating a method of providing an application of the computing apparatus 100 according to exemplary embodiments.

First, the computing apparatus 100 is connected to the cloud storage server 200 (S510). When the computing apparatus 100 is connected to the cloud storage server 200 (for example, through a network such as the Internet).

The computing apparatus 100 transmits user information and apparatus information to the cloud storage server 200 (S520). When the user information and the apparatus information are received, the cloud storage server 200 generates an application list and file system structure information based on the user information and apparatus information.

The computing apparatus 100 generates a virtual disc using the cloud storage server 200 (S530). The virtual disc may not have a physically allocated storage space, but the virtual disc is recognized as a local disc of the computing apparatus 100 by visualizing a storage space in the cloud storage server 200 as if the storage space is directly connected to the computing apparatus 100.

The applications included in the virtual disc may have been previously installed.

The computing apparatus 100 requests execution of an application included in the application list according to a user command (S540). The computing apparatus 100 may request the execution of the application by transmitting one of an ID and title of the requested application to the cloud storage server 200.

The computing apparatus 100 downloads a version region of the execution file of the application from the cloud storage server 200 (S550).

The computing apparatus 100 determines whether or not the execution file of the application has been previously stored using the downloaded version of the execution file of the application (S560).

When it is determined that the execution file of the application is an execution file which has been previously stored (S560—Y), the computing apparatus 100 determines whether or not the previously stored execution file is the most recent version (S570).

When it is determined that the previously stored execution file is the most recent version (S570—Y), the computing apparatus 100 executes the application using the previously stored execution file (S590).

However, if it is determined that the execution file of the application has not been previously stored (S560—N) or when it is determined that a version of the execution file of the application is not the most recent version (S570—N), the computing apparatus 100 may download the other regions of the execution file of the application (for example, a code region and a resource region) as described in FIGS. 3A to 3E.

The computing apparatus 100 executes the downloaded application (S590). The computing apparatus 100 may immediately execute the application when the computing apparatus 100 downloads minimum code information for executing the application.

FIG. 6 is a flowchart illustrating a method of providing an application of the cloud storage server 200 according to exemplary embodiments.

First, the cloud storage server 200 is connected to the computing apparatus 100. The cloud storage server 200 may be connected to the computing apparatus 100 directly, over a local network, over a wide-area network, over the Internet, etc., through a wired connection, a wireless connection, a combination of the two, etc.

The cloud storage server 200 receives user information and apparatus information from the connected computing apparatus 100 (S620).

The cloud storage server 200 generates a virtual disc based on the received user information and apparatus information (S630). Specifically, the cloud storage server 200 generates an application list available to the user and file system structure information to be executable by the computing apparatus 100 based on the apparatus information received from the computing apparatus 100. The cloud storage server 200 generates the virtual disc of the connected computing apparatus 100 based on the generated application list and file system structure information.

The cloud storage server 200 transmits the application list included in the virtual disc to the computing apparatus 100 (S640).

The cloud storage server 200 receives a request to execute an application of the transmitted applications, which is input from the user (S650). The cloud storage server 200 may receive information such as an ID and title of the requested application from the computing apparatus 100.

The cloud storage server 200 determines a type of the execution file of the requested application (S660). The cloud storage server 200 may determine the type of the execution file of the application under the consideration of an OS and platform of the connected computing apparatus 100 and factors affecting application execution such as supportable resolution of the display of computing apparatus 100.

The cloud storage server 200 transmits the determined type of the execution file of the application (S670). The cloud storage server 200 may preferentially transmit a version region of the execution file of the application. When the application has not been previously stored in the computing apparatus 100 or when a version of the execution file is not the most recent version, the cloud storage server 200 transmits remaining regions of the execution file as shown in FIGS. 3A to 3E. However, when the execution file of the requested application has been previously stored in the computing apparatus 100 and the version of the execution file is the most recent version, the cloud storage server 200 stops transmission of the execution file.

As described above, through the methods of providing an application of the computing apparatus 100 and the cloud storage server 200, it is possible for a user to remove time delay, which is caused in a downloading and executing process when the application is initially executed, using the virtual disc. In addition, an application may be automatically updated so that the most recent version of the execution file is conveniently available to the user.

A program code for executing the methods of providing an application according to the above-described various exemplary embodiments may be stored in various recording media. Specifically, the program code may be stored in various types of recording media readable by a terminal such as a random access memory (RAM), a flash memory, a read only memory (ROM), an erasable programmable ROM (EPROM), an electronically erasable and programmable ROM (EEPROM), a register, a hard disc, a removable disc, a memory card, a USB memory, a compact disc ROM (CD-ROM). Instructions for performing the above-described exemplary embodiments may be performed by a processor.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A cloud computing method, comprising:
    receiving, by a computing apparatus, a virtual disc for executing an application from a server connected to the computing apparatus;
    transmitting a request to execute the application; and
    downloading and executing an execution file corresponding to the requested application,
    wherein the downloading and executing the execution file comprises:
        identifying whether the execution file has been previously stored and whether a version of the previously stored execution file is a most recent version based on a version region of the execution file corresponding to the requested application; and
        in response to identifying that the execution file has been previously stored and the version of the previously stored execution file is the most recent version, canceling the downloading and executing the execution file corresponding to the requested application.

2. The method of claim 1, wherein the receiving a virtual disc comprises:
transmitting user information and apparatus information to the server; and
receiving an application list comprising one or more applications available to a user of the computing apparatus from the server based on the user information and the apparatus information.

3. The method of claim 2, wherein the application list comprises at least one of among an identification (ID) and a title of each of the one or more applications available to the user.

4. The method of claim 3, wherein the transmitting a request to execute the application comprises transmitting to the server at least one of among the ID and the title of the application to be executed.

5. The method of claim 1, wherein the downloaded execution file comprises an execution file determined based on at least one of among a platform and an operating system (OS) of the computing apparatus.

6. The method of claim 1, wherein the downloading and executing an execution file comprises:
determining whether the execution file of the requested application has been previously stored;
determining whether a version of the previously stored execution file is a most recent version in response to a determination that the execution file of the requested application has been previously stored; and
executing the previously stored execution file in response to a determination that the version of the previously stored execution file is the most recent version.

7. The method of claim 6, wherein the downloading and executing an execution file further comprises downloading and executing the execution file of the requested application in response to a determination that the execution file of the requested application has not been previously stored.

8. The method of claim 7, wherein the downloading and executing an execution file further comprises downloading and executing the execution file of the requested application in response to a determination that the version of the previously stored execution file is not the most recent version.

9. The method of claim 6, wherein the execution file of the application comprises a version region, a code region, and a resource region, and
the determining whether the execution file of the requested application has been previously stored and the determining whether the version of the previously stored execution file is the most recent version comprises downloading the version region of the execution file.

10. The method of claim 1, wherein the downloading and executing an execution file comprises downloading and executing a minimum region of the execution file of the requested application to execute the requested application before downloading a remaining region of the execution file of the requested application.

11. The method of claim 1, wherein the computing apparatus includes a display.

12. The method of claim 1, wherein the execution file corresponding to the requested application is determined based on at least one of platform, operation system and display size of the computing apparatus.

13. A computing apparatus, comprising:
a memory storing a program code;
a processor to execute the program code, wherein the program code comprises:
a communication unit configured to communicate with a server, receive from the server a virtual disc for executing an application, and transmit to the server a request to execute the application; and
a control unit configured to download and execute an execution file corresponding to the respected application,
wherein the control unit identifies whether the execution file has been previously stored and whether a version of the previously stored execution file is a most recent version based on a version region of the execution file corresponding to the requested application, and cancels, in response to identification that the execution file has been previously stored and the version of the previously stored execution file is the most recent version, the downloading and executing the execution file corresponding to the requested application.

14. The computing apparatus of claim 13, wherein the control unit controls the communication unit to transmit user information and apparatus information to the server and receive an application list comprising one or more applications available to a user of the computing apparatus from the server based on the user information and the apparatus information.

15. The computing apparatus of claim 14, wherein the application list comprises at least one of among an identification (ID) and a title of each of the one or more applications available to the user.

16. The computing apparatus of claim 15, wherein the communication unit transmits to the server at least one of among an ID and a title of an application to be executed to request execution of the application.

17. The computing apparatus of claim 13, wherein the downloaded execution file comprises an execution file determined based on a platform and an operating system (OS) of the computing apparatus.

18. The computing apparatus of claim 13, wherein the control unit determines whether the execution file of the requested application has been previously stored, determines whether a version of the previously stored execution file is a most recent version in response to a determination that the execution file of the requested application file has been previously stored, and executes the previously stored execution file in response to a determination that the version of the execution file is the most recent version.

19. The computing apparatus of claim 18, wherein the control unit downloads and executes the execution file of the requested application in response to a determination that the execution file of the requested application has not been previously stored.

20. The computing apparatus of claim 19, wherein the control unit downloads and executes the execution file of the requested application in response to a determination that the version of the previously stored execution file is not the most recent version.

21. The computing apparatus of claim 18, wherein the execution file of the application comprises a version region, a code region, and a resource region, and
the control unit downloads the version region of the execution file of the requested application to determine whether or not the execution file of the requested application has been previously stored and to determine whether the version of the previously stored execution file is the most recent version.

22. The computing apparatus of claim 13, wherein the control unit downloads a minimum region of the execution file of the requested application to execute the requested application and executes the requested application before downloading remaining regions of the execution file of the requested application.

23. The computing apparatus of claim 13, further comprising a display.

24. A cloud computing method, comprising:
receiving, by a server, user information and apparatus information of a computing apparatus from a computing apparatus;
generating a virtual disc based on the user information and apparatus information of the computing apparatus;
transmitting an application list comprising one or more applications available to a user of the computing apparatus; and
transmitting an execution file corresponding to a requested application in response to receiving a request to execute the requested application from the computing apparatus,
wherein the transmitting the execution file corresponding to the requested application comprises:
transmitting a version region of the execution file corresponding to the requested application;
in response to determining by the computing apparatus that the execution file has been previously stored and a version of the previously stored execution file is a most recent version based on the version region of the execution file, cancelling the transmitting; and
in response to determining by the computing apparatus that the execution file has not been previously stored or the version of the previously stored execution file is not the most recent version, transmitting the execution file.

25. The method of claim 24, wherein the application list includes at least one of among an identification (ID) and a title of each of the one or more applications available to the user.

26. The method of claim 24, wherein the receiving a request to execute the requested application comprises receiving one of among an ID and a title of the requested application.

27. The method of claim 24, wherein the execution file comprises an execution file determined based on a platform and an operating system (OS) of the computing apparatus.

28. The method of claim 24, wherein the execution file of the requested application comprises a version region, a code region, and a resource region, and
the transmitting an execution file comprises transmitting the version region of the execution file of the requested application before transmitting the code region and the resource region.

29. The method of claim 24, wherein the transmitting an execution file comprises:
transmitting a minimum region of the execution file of the requested application to execute the requested application before transmitting a remaining region of the execution file of the application.

30. A server providing an application to a computing apparatus, comprising:
a memory storing a program code;
a processor to execute the program code, wherein the program code comprises:
a communication unit configured to communicate with a computing apparatus, receive user information and apparatus information from the computing apparatus, transmit an application list comprising applications available to a user of the computing apparatus, and receives receive a request to execute an application from the computing apparatus; and
a control unit configured to generate a virtual disc based on the user information and the apparatus information of the computing apparatus, and control the communication unit to transmit an execution file corresponding to the requested application in response to the request from the computing apparatus,
wherein the control unit controls the communication unit to transmit a version region of the execution file corresponding to the requested application, in response to determining by the computing apparatus that the execution file has been previously stored and a version of the previously stored execution file is a most recent version based on the version region of the execution file, cancels the transmitting, and in response to determining by the computing apparatus that the execution file has not been previously stored or the version of the previously stored execution file is not the most recent version, controls the communication unit to transmit the execution file.

31. The server of claim 30, wherein the application list includes at least one of among an identification (ID) and a title of each of the applications available to the user.

32. The server of claim 30, wherein the communication unit receives one of among an ID and a title of the requested application from the computing apparatus.

33. The server of claim 30, wherein the execution file of the requested application comprises an execution file determined based on a platform and an operating system (OS) of the computing apparatus.

34. The server of claim 30, wherein the execution file of the requested application includes a version region, a code region, and a resource region, and
the communication unit transmits the version region of the execution file of the application before the communication unit transmits the code region and the resource region.

35. The server of claim 30, wherein the communication unit transmits a minimum region of the execution file of the requested application to execute the requested application before transmitting a remaining region of the execution file of the requesting application.

* * * * *